(12) United States Patent
Lu et al.

(10) Patent No.: US 9,318,950 B2
(45) Date of Patent: Apr. 19, 2016

(54) CONTROL CIRCUIT FOR REDUCING TOUCH CURRENT OF A POWER CONVERTER AND OPERATION METHOD THEREOF

(71) Applicant: Leadtrend Technology Corp., Hsin-Chu (TW)

(72) Inventors: Hsin-Hung Lu, Hsin-Chu (TW); Chen-Lun Yang, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/337,251

(22) Filed: Jul. 22, 2014

(65) Prior Publication Data

US 2015/0028821 A1    Jan. 29, 2015

(30) Foreign Application Priority Data

Jul. 23, 2013   (TW) .............................. 102126346 A (51) Int. Cl.
*H02M 1/42*    (2007.01)

(52) U.S. Cl.
CPC .................. *H02M 1/4225* (2013.01)

(58) Field of Classification Search
CPC ....... H02M 1/42; H02M 1/4225; H02M 7/02; H02M 7/12; H02M 3/24; H02M 2001/00351; H02M 2001/0025; G05F 1/70
See application file for complete search history.

(56) References Cited

U.S. PATENT DOCUMENTS

| | | | | |
|---|---|---|---|---|
| 4,356,541 A * | 10/1982 | Ikenoue | ............ | H02M 3/33576 363/126 |
| 4,723,098 A * | 2/1988 | Grubbs | ................ | H02H 7/1227 315/239 |
| 5,291,383 A * | 3/1994 | Oughton | ................. | H02J 9/062 363/132 |
| 6,118,675 A * | 9/2000 | Lionetto | ................. | H02M 1/36 363/21.13 |
| 2008/0278974 A1* | 11/2008 | Wu | ......................... | H02M 1/40 363/21.18 |
| 2009/0134859 A1* | 5/2009 | Shiroyama | ........ | H02M 3/33507 323/282 |
| 2010/0053998 A1* | 3/2010 | Shimada | ........... | H02M 3/33507 363/21.01 |
| 2010/0165683 A1 | 7/2010 | Sugawara | | |

(Continued)

FOREIGN PATENT DOCUMENTS

CN           101826796 A      9/2010

*Primary Examiner* — Timothy J Dole
*Assistant Examiner* — Yusef Ahmed
(74) *Attorney, Agent, or Firm* — Winston Hsu; Scott Margo (57) ABSTRACT

A control circuit for reducing touch current of a power converter includes an auxiliary pin, a zero-crossing signal generator, a frequency limiting signal generator, and a gate signal generator. The auxiliary pin is used for receiving a voltage generated by an auxiliary winding of the power converter. The zero-crossing signal generator is used for generating a zero-crossing signal according to the voltage generated by the auxiliary winding and a first reference voltage. The frequency limiting signal generator is used for generating a frequency limiting signal according to a gate control signal, a burst mode signal, and the voltage generated by the auxiliary winding. The frequency limiting signal is used for limiting the gate control signal to a predetermined frequency. The gate signal generator is used for generating the gate control signal to a power switch of the power converter according to the frequency limiting signal and the zero-crossing signal.

16 Claims, 6 Drawing Sheets

(56) References Cited

U.S. PATENT DOCUMENTS

| | | | | |
|---|---|---|---|---|
| 2011/0149614 A1* | 6/2011 | Stracquadaini | H02M 3/33507 | 363/21.12 |
| 2012/0043818 A1* | 2/2012 | Stratakos | H02J 3/383 | 307/77 |
| 2012/0092900 A1* | 4/2012 | Orr | H02M 1/4208 | 363/21.03 |
| 2012/0161727 A1* | 6/2012 | Yeh | H02M 3/33507 | 323/234 |
| 2012/0201063 A1* | 8/2012 | Sugawara | H02M 1/4225 | 363/89 |
| 2012/0249013 A1* | 10/2012 | Valois | H05B 37/0227 | 315/291 |
| 2013/0077354 A1* | 3/2013 | Behagel | H02M 3/33523 | 363/21.01 |
| 2013/0100711 A1* | 4/2013 | Langeslag | H02M 3/33507 | 363/21.12 |
| 2013/0187621 A1* | 7/2013 | Yang | G01F 1/10 | 323/237 |
| 2014/0307478 A1* | 10/2014 | Leisten | H02M 3/33523 | 363/15 |
| 2014/0362621 A1* | 12/2014 | Huang | H02M 3/33507 | 363/50 |
| 2014/0369097 A1* | 12/2014 | Prescott | H02M 1/4225 | 363/89 |
| 2015/0103567 A1* | 4/2015 | Wang | H02M 3/33592 | 363/21.13 |
| 2015/0244275 A1* | 8/2015 | Hinz | H02M 3/33507 | 363/21.17 |
| 2015/0311810 A1* | 10/2015 | Chen | H02M 3/33515 | 363/21.13 |

* cited by examiner

CONTROL CIRCUIT FOR REDUCING TOUCH CURRENT OF A POWER CONVERTER AND OPERATION METHOD THEREOF

BACKGROUND OF THE INVENTION

1. Field of the Invention

The present invention relates to a control circuit for reducing touch current of a power converter and an operation method thereof, and particularly to a control circuit and an operation method thereof that can reduce touch current generated by quick decrease of a voltage of an input capacitor when a power converter leaves a burst mode.

2. Description of the Prior Art

In the prior art, when a power factor correction (PFC) power converter is in a high output voltage and light load operation, the power converter will enter a burst mode. After the power converter enters the burst mode, a power switch of the power converter can be switched according to a gate control signal corresponding to the burst mode. Meanwhile, because current consumption of the power converter is very small, a voltage of an input capacitor of the power converter will be kept at a voltage when the power switch stops being switched. When the power converter leaves the burst mode, the power switch starts to be switched according to a gate control signal corresponding to a quasi-resonant mode. Meanwhile, if an input voltage is less than the voltage of the input capacitor, diodes within a bridge rectifier of the power converter cannot be conducted, resulting in the input capacitor providing power to an inductor of the power converter. Thus, the voltage of the input capacitor will be decreased. Meanwhile, because the power converter operates in the highest frequency (corresponding to the quasi-resonant mode), the voltage of the input capacitor will be decreased quickly, resulting in a touch current over a standard specified by a safety specification.

In addition, the prior art only adjusts parameters of the power converter to solve a problem of the touch current over the standard, so the prior art only solve the problem of the touch current over the standard partially. Therefore, a designer of the power converter needs to find a new solution to replace with the prior art.

SUMMARY OF THE INVENTION

An embodiment provides a control circuit for reducing touch current of a power converter, wherein the power converter is a power factor correction (PFC) power converter. The control circuit includes an auxiliary pin, a zero-crossing signal generator, a frequency limiting signal generator, and a gate signal generator. The auxiliary pin is used for receiving a voltage generated by an auxiliary winding of the power converter. The zero-crossing signal generator is used for generating a zero-crossing signal according to the voltage generated by the auxiliary winding and a first reference voltage. The frequency limiting signal generator is used for generating a frequency limiting signal according to a gate control signal, a burst mode signal, and the voltage generated by the auxiliary winding, wherein the frequency limiting signal is used for limiting the gate control signal to a predetermined frequency. The gate signal generator is used for generating the gate control signal to a power switch of the power converter according to the frequency limiting signal and the zero-crossing signal.

Another embodiment provides an operation method of a control circuit for reducing touch current of a power converter. The operation method includes receiving a voltage generated by an auxiliary winding of the power converter; generating a zero-crossing signal according to the voltage generated by the auxiliary winding and a first reference voltage; receiving a feedback voltage corresponding to an output voltage of the power converter; and generating a gate control signal to a power switch of the power converter according to the gate control signal, a burst mode reference voltage, the zero-crossing signal, the feedback voltage, and the voltage generated by the auxiliary winding.

The present invention provides a control circuit for reducing touch current of a power converter and an operation method thereof. The control circuit and the operation method utilize a frequency limiting signal generator to generate a frequency limiting signal to limit a gate control signal to a predetermined frequency until the frequency limiting signal generator does not generate the frequency limiting signal according to a gate control signal and a voltage generated by an auxiliary winding when the power converter leaves a burst mode. After the frequency limiting signal generator does not generate the frequency limiting signal, a gate signal generator can generate the gate control signal corresponding to a quasi-resonant mode to a power switch of the power converter according to a zero-crossing signal. Thus, compared to the prior art, the present invention can slow down decrease of a voltage of an input capacitor to reduce a touch current when the power converter leaves the burst mode. In addition, the present invention cannot reduce a power factor value of the power converter because the frequency limiting mechanism provides by the present invention just works after the power converter leaves the burst mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
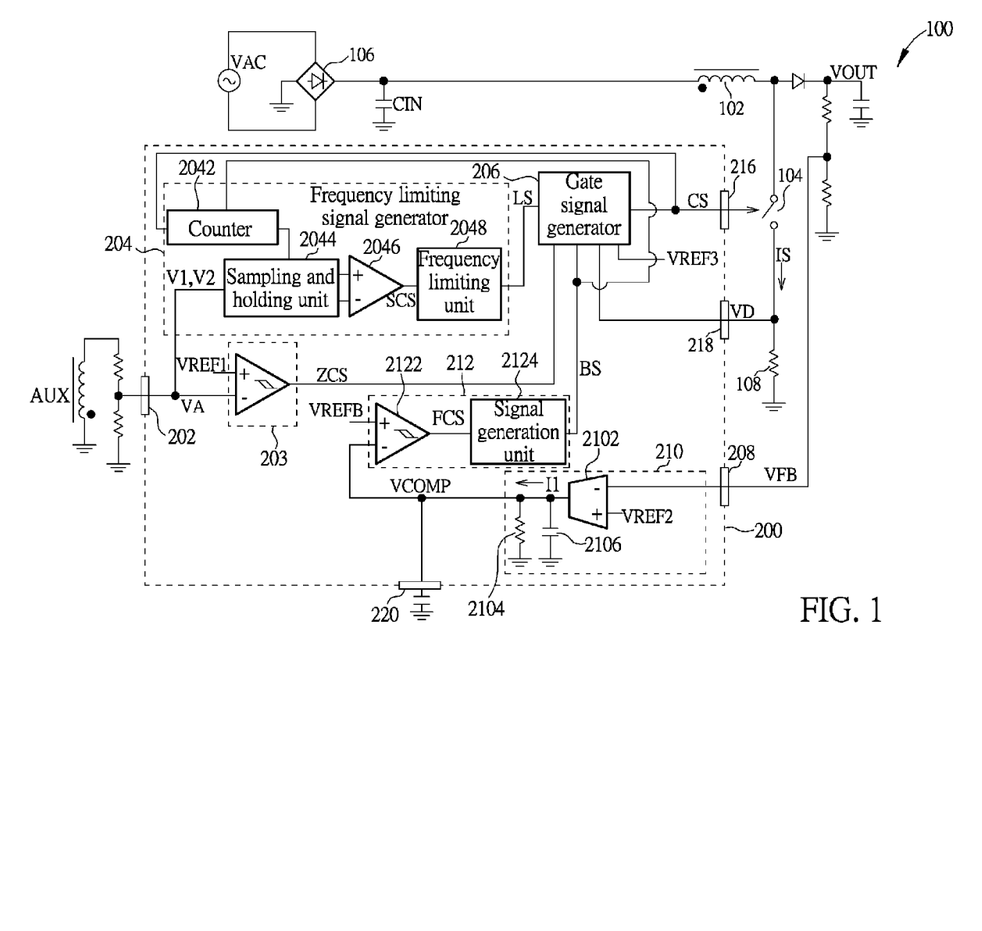
FIG. 1 is a diagram illustrating a control circuit 200 of a power converter 100 according to an embodiment

Please refer to FIG. 1. FIG. 1 is a diagram illustrating a control circuit 200 of a power converter 100 according to an embodiment, wherein the power converter 100 can be a power factor correction (PFC) power converter, and also a boost power converter. The control circuit 200 includes an auxiliary pin 202, a zero-crossing signal generator 203, a frequency limiting signal generator 204, and a gate signal generator 206, wherein the auxiliary pin 202 is used for receiving a voltage VA generated by an auxiliary winding AUX of the power converter 100. The zero-crossing signal generator 203 is used for generating a zero-crossing signal ZCS according to the voltage VA generated by the auxiliary winding AUX and a first reference voltage VREF1, wherein the first reference voltage VREF1 is about 0.2V-0.3V. As shown in FIG. 1, the zero-crossing signal generator 203 can be a hysteresis comparator. But, the present invention is not limited to the zero-crossing signal generator 203 being a hysteresis comparator. As shown in FIG. 1, the control circuit 200 further includes a feedback pin 208, a compensation voltage generation unit 210, a burst mode signal generation module 212, a gate pin 216, and a current pin 218. In addition, as shown in FIG. 1, an induction direction of the auxiliary winding AUX is opposite to an induction direction of an inductor 102 coupled to the power converter 100.

As shown in FIG. 1, the feedback pin 208 is used for receiving a feedback voltage VFB corresponding to an output voltage VOUT of the power converter 100, wherein the feedback voltage VFB corresponds to a load coupled to the power converter 100. That is to say, the feedback voltage VFB is changed with the load coupled to the power converter 100. The compensation voltage generation unit 210 is used for generating a compensation voltage VCOMP according to the feedback voltage VFB and a second reference voltage VREF2. The compensation voltage generation unit 210 includes a transconductance amplifier 2102, a first resistor 2104, and a first capacitor 2106. The transconductance amplifier 2102 is used for generating a first current I1 according to the feedback voltage VFB and the second reference voltage VREF2, and the first resistor 2104 and the first capacitor 2106 are used for generating the compensation voltage VCOMP according to the first current I1. In addition, the compensation voltage generation unit 210 shown in FIG. 1 is only used for describing the control circuit 200. That is to say, the present invention is not limited to the compensation voltage generation unit 210 shown in FIG. 1. In addition, the power converter 100 further includes a compensation pin 220 coupled to an output terminal of the compensation voltage generation unit 210.

As shown in FIG. 1, the burst mode signal generation module 212 includes a first comparator 2122 and a signal generation unit 2124. The first comparator 2122 is used for generating a first comparison result FCS according to the compensation voltage VCOMP and a burst mode reference voltage VREFB. That is to say, when the compensation voltage VCOMP is less than the burst mode reference voltage VREFB, the first comparator 2122 generates the first comparison result FCS. When the signal generation unit 2124 receives the first comparison result FCS, the signal generation unit 2124 can generate a burst mode signal BS to the gate signal generator 206 according to the first comparison result FCS (that is to say, the power converter 100 enters a burst mode). When the gate signal generator 206 receives the burst mode signal BS, the gate signal generator 206 can generate a gate control signal CS corresponding to the burst mode according to the burst mode signal BS and the zero-crossing signal ZCS, and the gate control signal CS is transmitted to a power switch 104 of the power converter 100 through the gate pin 216. Thus, the power switch 104 can be turned on according to the gate control signal CS corresponding to the burst mode.

As shown in FIG. 1, the frequency limiting signal generator 204 includes a counter 2042, a sampling and holding unit 2044, a second comparator 2046, and a frequency limiting unit 2048. The counter 2042 is used for receiving the gate control signal CS, wherein when the signal generation unit 2124 stops generating the burst mode signal BS (that is to say, the power converter 100 leaves the burst mode), the counter 2042 starts to count the gate control signal CS, and generates a first number FN and a second number SN according to the gate control signal CS, wherein the first number FN is less than the second number SN. For example, the first number FN is 1 and the second number SN is 3. But, the present invention is not limited to the first number FN being 1 and the second number SN being 3. The sampling and holding unit 2044 is used for storing a first voltage V1 generated by the auxiliary winding AUX corresponding to the first number FN, and a second voltage V2 generated by the auxiliary winding AUX corresponding to the second number SN. The second comparator 2046 is used for generating a second comparison result SCS when the second voltage V2 is greater than the first voltage V1. Because the induction direction of the auxiliary winding AUX is opposite to the induction direction of the inductor 102, when the second voltage V2 is greater than the first voltage V1, an input capacitor CIN of the power converter 100 provides power to the inductor 102 of the power converter 100. That is to say, when the second voltage V2 is greater than the first voltage V1, diodes within a bridge rectifier 106 of the power converter 100 cannot be conducted, so meanwhile a power source VAC cannot provide power to the inductor 102. The frequency limiting unit 2048 is used for generating a frequency limiting signal LS to the gate signal generator 206 according to the second comparison result SCS. The frequency limiting signal LS is used for limiting the gate control signal CS generated by the gate signal generator 206 to a predetermined frequency (e.g. 25 KHz), wherein the predetermined frequency is adjustable. Thus, after the power converter 100 leaves the burst mode, the frequency limiting signal generator 204 can first let the gate signal generator 206 generate the gate control signal CS with the predetermined frequency to the power switch 104 of the power converter 100 according to the frequency limiting signal LS and the zero-crossing signal ZCS. Thus, the power switch 104 can be turned on according to the gate control signal CS with the predetermined frequency. In addition, after the frequency limiting unit 2048 generates the frequency limiting signal LS to the gate signal generator 206 according to the second comparison result SCS, the counter 2042, the sampling and holding unit 2044, the second comparator 2046, and the frequency limiting unit 2048 can execute the above mentioned steps repeatedly until the second voltage V2 sampled by the sampling and holding unit 2044 is less than the first voltage V1 sampled by the sampling and holding unit 2044.

As shown in FIG. 1, when the power converter 100 leaves the burst mode and the second voltage V2 is less than the first voltage V1 (that is to say, the frequency limiting signal generator 204 does not generate the frequency limiting signal LS, and the power converter 100 enters a quasi-resonant mode), the zero-crossing signal generator 203 is used for generating the zero-crossing signal ZCS to the gate signal generator 206 according to the voltage VA generated by the auxiliary winding AUX and the first reference voltage VREF1. Meanwhile, the gate signal generator 206 is used for generating the gate control signal CS corresponding to the quasi-resonant mode to the power switch 104 according to the zero-crossing signal ZCS. Thus, the power switch 104 can be turned on according to the gate control signal CS corresponding to the quasi-resonant mode.

In addition, as shown in FIG. 1, the current pin 218 is used for receiving a detection voltage VD determined according to a current IS flowing through the power switch 104 and a resistor 108. The gate signal generator 206 is further used for disabling the gate control signal CS according to the detection voltage VD and a third reference voltage VREF3. That is to say, when the detection voltage VD is greater than the third reference voltage VREF3, the gate signal generator 206 disables the gate control signal CS to turn off the power switch 104.

Figure 2:
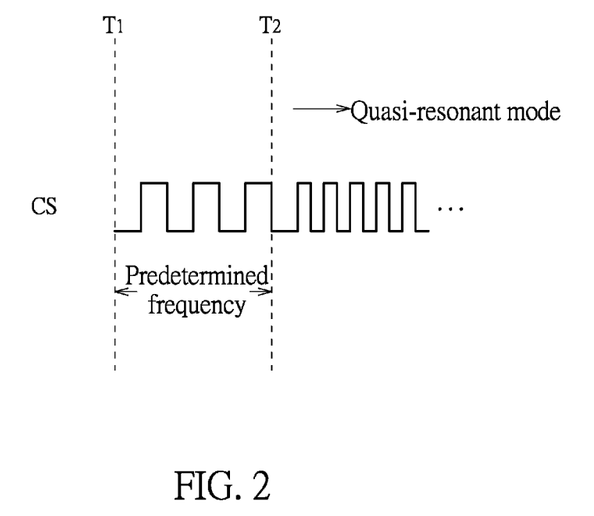
FIG. 2 and FIG. 3 are diagrams illustrating the gate signal generator generating the gate control signal with the predetermined frequency according to the frequency limiting signal and the zero-crossing signal, and generating the gate control signal corresponding to the quasi-resonant mode according to the zero-crossing signal, respectively.
Figure 3:
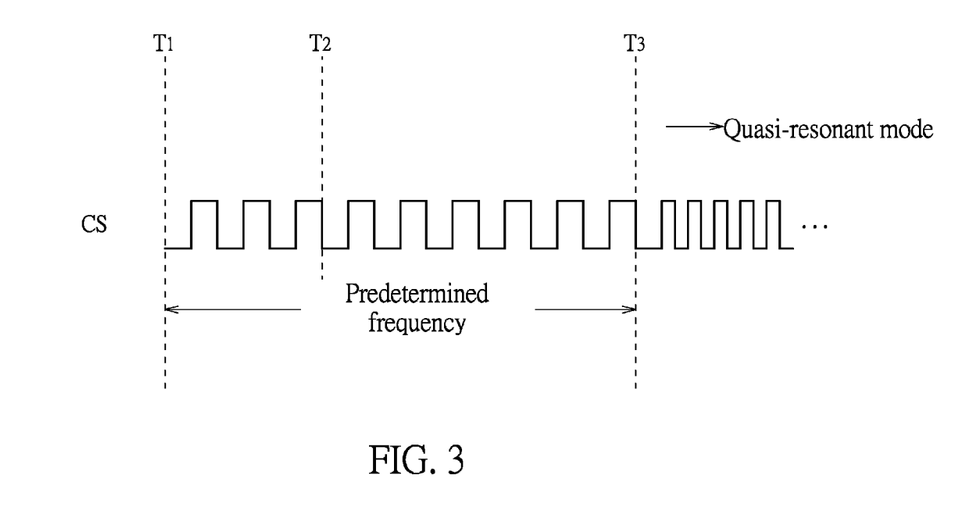
Figure 4:
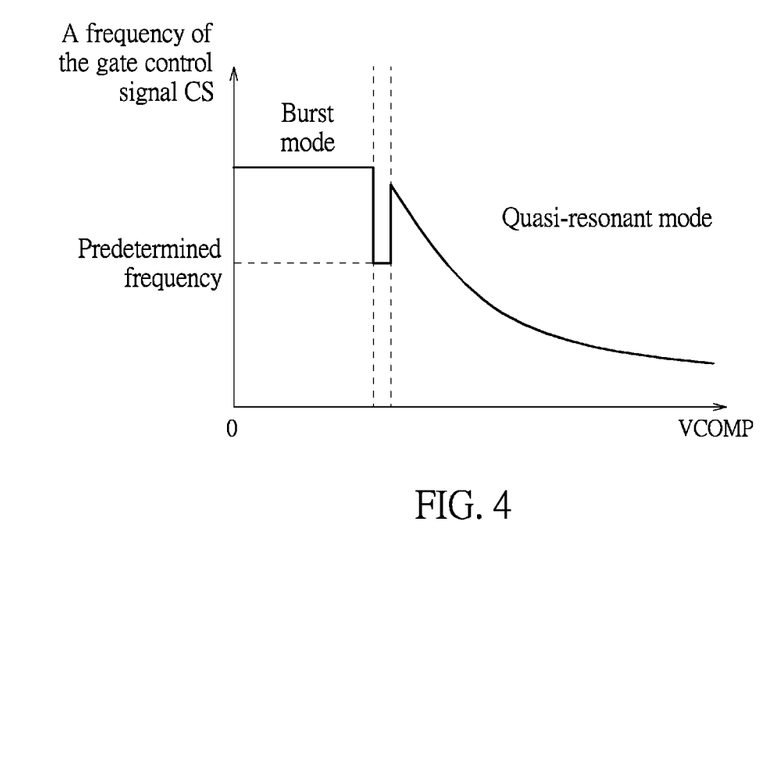
FIG. 4 is a diagram illustrating a relationship between a frequency of the gate control signal and the compensation voltage.

Please refer to FIG. 2, FIG. 3, and FIG. 4. FIG. 2 and FIG. 3 are diagrams illustrating the gate signal generator 206 generating the gate control signal CS with the predetermined frequency according to the frequency limiting signal LS and the zero-crossing signal ZCS, and generating the gate control signal CS corresponding to the quasi-resonant mode according to the zero-crossing signal ZCS, respectively, and FIG. 4 is a diagram illustrating a relationship between a frequency of the gate control signal CS and the compensation voltage VCOMP. As shown in FIG. 2, at a time T1, the power converter 100 leaves the burst mode, so the frequency limiting signal generator 204 generates the frequency limiting signal LS to the gate signal generator 206, and the gate signal generator 206 generates the gate control signal CS with the predetermined frequency according to the frequency limiting signal LS and the zero-crossing signal ZCS. Then, at completion of a third gate control signal CS (that is, at a time T2), the second voltage V2 sampled by the sampling and holding unit 2044 is less than the first voltage V1 sampled by the sampling and holding unit 2044, so the second comparator 2046 does not generate the second comparison result SCS, resulting in the frequency limiting unit 2048 not generating the frequency limiting signal LS to the gate signal generator 206. Therefore, after a fourth gate control signal CS, the gate signal generator 206 generates the gate control signal CS corresponding to the quasi-resonant mode according to the zero-crossing signal ZCS. As shown in FIG. 3, at the time T1, the power converter 100 leaves the burst mode, so the frequency limiting signal generator 204 generates the frequency limiting signal LS to the gate signal generator 206, and the gate signal generator 206 generates the gate control signal CS with the predetermined frequency according to the frequency limiting signal LS and the zero-crossing signal ZCS. Then, at the completion of the third gate control signal CS (that is, at the time T2), the second voltage V2 sampled by the sampling and holding unit 2044 is greater than the first voltage V1 sampled by the sampling and holding unit 2044, so the second comparator 2046 generates the second comparison result SCS, resulting in the frequency limiting unit 2048 generating the frequency limiting signal LS to the gate signal generator 206. Therefore, after the fourth gate control signal CS, the gate signal generator 206 still generates the gate control signal CS with the predetermined frequency according to the frequency limiting signal LS and the zero-crossing signal ZCS. After the gate signal generator 206 generates the gate control signal CS with the predetermined frequency according to the frequency limiting signal LS and the zero-crossing signal ZCS, the counter 2042, the sampling and holding unit 2044, the second comparator 2046, and the frequency limiting unit 2048 can execute the above mentioned steps repeatedly until the second voltage V2 sampled by the sampling and holding unit 2044 is less than the first voltage V1 sampled by the sampling and holding unit 2044 (e.g. at a time T3). Because at the time T3 (that is, at completion of a ninth gate control signal CS), the second voltage V2 sampled by the sampling and holding unit 2044 is less than the first voltage V1 sampled by the sampling and holding unit 2044, so the second comparator 2046 does not generate the second comparison result SCS, resulting in the frequency limiting unit 2048 not generating the frequency limiting signal LS to the gate signal generator 206. Therefore, after the ninth gate control signal CS, the gate signal generator 206 generates the gate control signal CS corresponding to the quasi-resonant mode according to the zero-crossing signal ZCS.

As shown in FIG. 4, the frequency of the gate control signal CS is kept at the predetermined frequency for a period of time after the power converter 100 leaves the burst mode. Then, the gate signal generator 206 just generates the gate control signal CS corresponding to the quasi-resonant mode according to the zero-crossing signal ZCS.

Figure 5A:
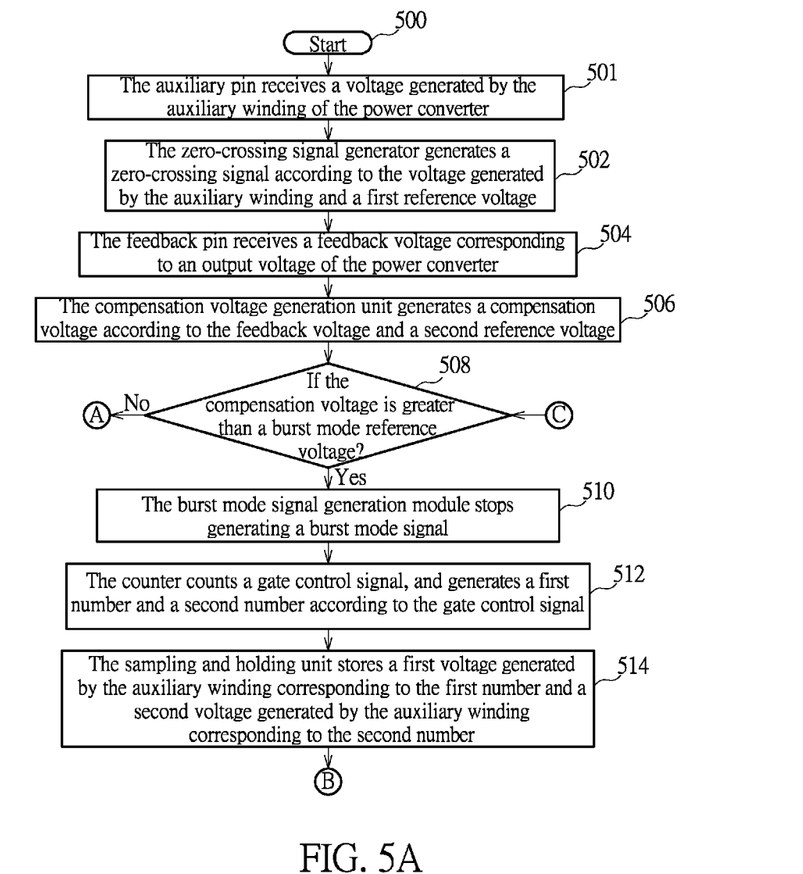
FIG. 5A and FIG. 5B are flowcharts illustrating an operation method of a control circuit for reducing touch current of a power converter according to another embodiment.
Figure 5B:
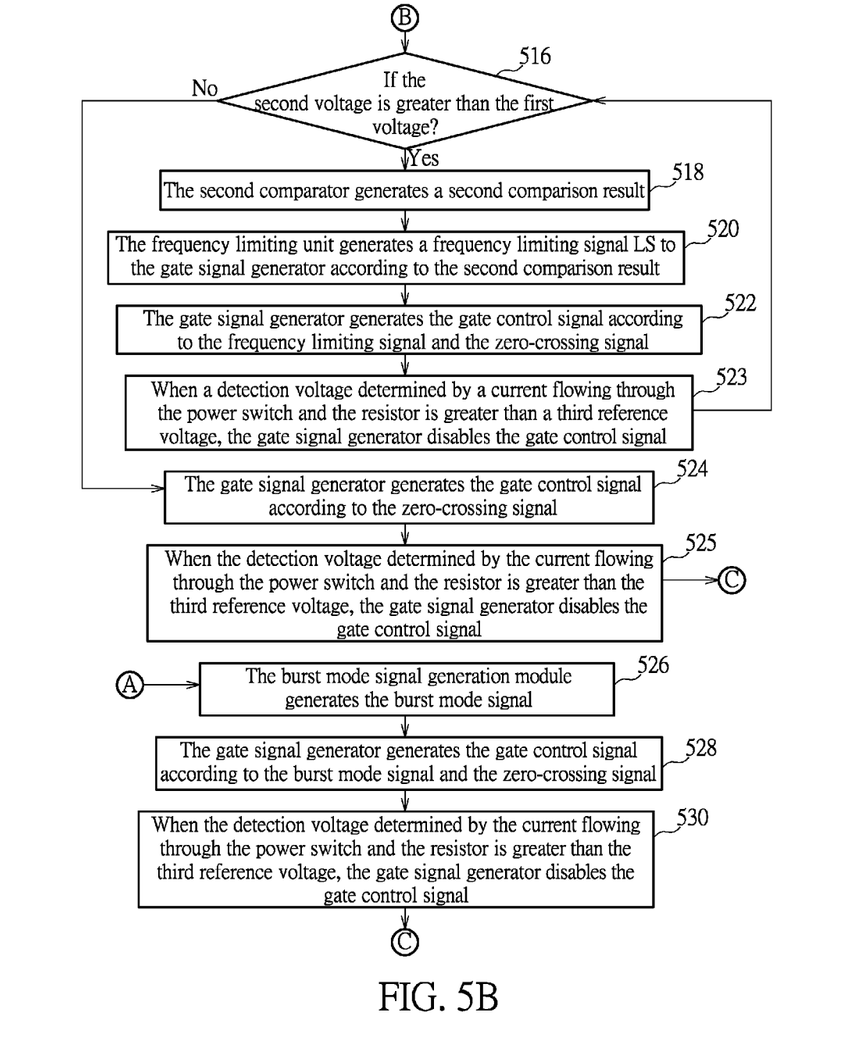

Please refer to FIG. 1, FIG. 2, FIG. 3, FIG. 4, FIG. 5A, and FIG. 5B. FIG. 5A and FIG. 5B are flowcharts illustrating an operation method of a control circuit for reducing touch current of a power converter according to another embodiment. The method in FIG. 5A and FIG. 5B is illustrated using the power converter 100 and the control circuit 200 in FIG. 1. Detailed steps are as follows:

Step 500: Start.

Step 501: The auxiliary pin 202 receives a voltage VA generated by the auxiliary winding AUX of the power converter 100.

Step 502: The zero-crossing signal generator 203 generates a zero-crossing signal ZCS according to the voltage VA generated by the auxiliary winding AUX and a first reference voltage VREF1.

Step 504: The feedback pin 208 receives a feedback voltage VFB corresponding to an output voltage VOUT of the power converter 100.

Step 506: The compensation voltage generation unit 210 generates a compensation voltage VCOMP according to the feedback voltage VFB and a second reference voltage VREF2.

Step 508: If the compensation voltage VCOMP is greater than a burst mode reference voltage VREFB; if yes, go to Step 510; if no, go to Step 526.

Step 510: The burst mode signal generation module 212 stops generating a burst mode signal BS.

Step 512: The counter 2042 counts a gate control signal CS, and generates a first number FN and a second number SN according to the gate control signal CS.

Step 514: The sampling and holding unit 2044 stores a first voltage V1 generated by the auxiliary winding AUX corresponding to the first number FN and a second voltage V2 generated by the auxiliary winding AUX corresponding to the second number SN.

Step 516: If the second voltage V2 is greater than the first voltage V1; if yes, go to Step 518; if no, go to Step 524.

Step 518: The second comparator 2046 generates a second comparison result SCS.

Step 520: The frequency limiting unit 2048 generates a frequency limiting signal LS to the gate signal generator 206 according to the second comparison result SCS.

Step 522: The gate signal generator 206 generates the gate control signal CS according to the frequency limiting signal LS and the zero-crossing signal ZCS.

Step 523: When a detection voltage VD determined by a current IS flowing through the power switch 104 and the resistor 108 is greater than a third reference voltage VREF3, the gate signal generator 206 disables the gate control signal CS, go to Step 516.

Step 524: The gate signal generator 206 generates the gate control signal CS according to the zero-crossing signal ZCS.

Step 525: When the detection voltage VD determined by the current IS flowing through the power switch 104 and the resistor 108 is greater than the third reference voltage VREF3, the gate signal generator 206 disables the gate control signal CS, go to Step 508.

Step 526: The burst mode signal generation module 212 generates the burst mode signal BS.

Step 528: The gate signal generator 206 generates the gate control signal CS according to the burst mode signal BS and the zero-crossing signal ZCS.

Step 530: When the detection voltage VD determined by the current IS flowing through the power switch 104 and the resistor 108 is greater than the third reference voltage VREF3, the gate signal generator 206 disables the gate control signal CS, go to Step 508.

In Step 501, as shown in FIG. 1, the auxiliary pin 202 receives the voltage VA generated by the auxiliary winding AUX, wherein the induction direction of the auxiliary winding AUX is opposite to the induction direction of the inductor 102. In Step 504, as shown in FIG. 1, the feedback pin 208 is used for receiving the feedback voltage VFB corresponding to the output voltage VOUT of the power converter 100, wherein the feedback voltage VFB corresponds to the load coupled to the power converter 100. That is to say, the feedback voltage VFB is changed with the load coupled to the power converter 100. In Step 506, as shown in FIG. 1, the transconductance amplifier 2102 of the compensation voltage generation unit 210 generates a first current I1 according to the feedback voltage VFB and the second reference voltage VREF2, and the first resistor 2104 and the first capacitor 2106 of the compensation voltage generation unit 210 are used for generating the compensation voltage VCOMP according to the first current I1.

In Step 526, as shown in FIG. 1, the first comparator 2122 is used for generating a first comparison result FCS according to the compensation voltage VCOMP and the burst mode reference voltage VREFB. That is to say, when the compensation voltage VCOMP is less than the burst mode reference voltage VREFB, the first comparator 2122 generates the first comparison result FCS. When the signal generation unit 2124 receives the first comparison result FCS, the signal generation unit 2124 can generate the burst mode signal BS to the gate signal generator 206 according to the first comparison result FCS (that is to say, the power converter 100 enters a burst mode). In Step 528, when the gate signal generator 206 receives the burst mode signal BS, the gate signal generator 206 can generate the gate control signal CS corresponding to the burst mode according to the burst mode signal BS and the zero-crossing signal ZCS, and the gate control signal CS is transmitted to the power switch 104 of the power converter 100 through the gate pin 216. Thus, the power switch 104 can be turned on according to the gate control signal CS corresponding to the burst mode.

In Step 510, as shown in FIG. 1, when the compensation voltage VCOMP is greater than the burst mode reference voltage VREFB, the first comparator 2122 does not generate the first comparison result FCS, resulting in the signal generation unit 2124 stopping generating the burst mode signal BS (that is to say, the power converter 100 leaves the burst mode). In Step 512, when the signal generation unit 2124 stops generating the burst mode signal BS, the counter 2042 starts to count the gate control signal CS, and generates the first number FN and the second number SN according to the gate control signal CS, wherein the first number FN is less than the second number SN. For example, the first number FN is 1 and the second number SN is 3. But, the present invention is not limited to the first number FN being 1 and the second number SN being 3. In Step 518, the second comparator 2046 is used for generating the second comparison result SCS when the second voltage V2 is greater than the first voltage V1. Because the induction direction of the auxiliary winding AUX is opposite to the induction direction of the inductor 102, the input capacitor CIN of the power converter 100 provides power to the inductor 102 of the power converter 100 when the second voltage V2 is greater than the first voltage V1. That is to say, diodes within the bridge rectifier 106 of the power converter 100 cannot be conducted when the second voltage V2 is greater than the first voltage V1, so meanwhile the power source VAC cannot provide power to the inductor 102. In Step 520, the frequency limiting signal LS is used for limiting the gate control signal CS generated by the gate signal generator 206 to a predetermined frequency (e.g. 25 KHz), wherein the predetermined frequency is adjustable. Thus, in Step 522, after the power converter 100 leaves the burst mode, the frequency limiting signal generator 204 can first let the gate signal generator 206 generate the gate control signal CS with the predetermined frequency to the power switch 104 of the power converter 100 according to the frequency limiting signal LS and the zero-crossing signal ZCS. Thus, the power switch 104 can be turned on according to the gate control signal CS with the predetermined frequency. In addition, after the frequency limiting unit 2048 generates the frequency limiting signal LS to the gate signal generator 206 according to the second comparison result SCS, the counter 2042, the sampling and holding unit 2044, the second comparator 2046, and the frequency limiting unit 2048 can execute the above mentioned steps repeatedly until the second voltage V2 sampled by the sampling and holding unit 2044 is less than the first voltage V1 sampled by the sampling and holding unit 2044 (as shown in FIG. 2 and FIG. 3).

In Step 524, as shown in FIG. 1, when the power converter 100 leaves the burst mode and the second voltage V2 is less than the first voltage V1 (that is to say, the frequency limiting signal generator 204 does not generate the frequency limiting signal LS, and the power converter 100 enters a quasi-resonant mode), the gate signal generator 206 is used for generating the gate control signal CS corresponding to the quasi-resonant mode to the power switch 104 according to the zero-crossing signal ZCS. Thus, the power switch 104 can be turned on according to the gate control signal CS corresponding to the quasi-resonant mode.

In addition, in Step 523, Step 525, and Step 530, as shown in FIG. 1, the current pin 218 is used for receiving the detection voltage VD determined according to the current IS flowing through the power switch 104 and the resistor 108. When the detection voltage VD is greater than the third reference voltage VREF3, the gate signal generator 206 disables the gate control signal CS to turn off the power switch 104.

Therefore, in Step 510 to Step 523, as shown in FIG. 4, the frequency of the gate control signal CS is kept at the predetermined frequency for a period of time after the power converter 100 leaves the burst mode. Then, in Step 524, the gate signal generator 206 just generates the gate control signal CS corresponding to the quasi-resonant mode according to the zero-crossing signal ZCS.

To sum up, the control circuit for reducing touch current of the power converter and the operation method thereof utilize the frequency limiting signal generator to generate a frequency limiting signal to limit a gate control signal to a predetermined frequency until the frequency limiting signal generator does not generate the frequency limiting signal according to a gate control signal and a voltage generated by the auxiliary winding when the power converter leaves the burst mode. After the frequency limiting signal generator does not generate the frequency limiting signal, the gate signal generator can generate the gate control signal corresponding to the quasi-resonant mode to the power switch of the power converter according to a zero-crossing signal. Thus, compared to the prior art, the present invention can slow down decrease of a voltage of the input capacitor to reduce a touch current when the power converter leaves the burst mode. In addition, the present invention cannot reduce a power factor value of the power converter because the frequency limiting mechanism provides by the present invention just works after the power converter leaves the burst mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit for reducing touch current of a power converter, wherein the power converter is a power factor correction (PFC) power converter, the control circuit comprising:
    an auxiliary pin for receiving a voltage generated by an auxiliary winding of the power converter;
    a zero-crossing signal generator for generating a zero-crossing signal according to the voltage generated by the auxiliary winding and a first reference voltage;
    a frequency limiting signal generator for generating a frequency limiting signal according to a gate control signal, a burst mode signal, and the voltage generated by the auxiliary winding, wherein the frequency limiting signal is used for limiting the gate control signal to a predetermined frequency;
    a gate signal generator for generating the gate control signal to a power switch of the power converter according to the frequency limiting signal and the zero-crossing signal;
    a feedback pin for receiving a feedback voltage corresponding to an output voltage of the power converter, wherein the feedback voltage corresponds to a load coupled to the power converter;
    a compensation voltage generation unit for generating a compensation voltage according to the feedback voltage and a second reference voltage; and
    a burst mode signal generation module, comprising:
        a first comparator for generating a first comparison result according to the compensation voltage and a burst mode reference voltage; and
        a signal generation unit for generating the burst mode signal to the gate signal generator according to the first comparison result;
    wherein the gate signal generator further generates the gate control signal to the power switch according to the burst mode signal and the zero-crossing signal.

2. The control circuit of the claim 1, wherein the compensation voltage generation unit comprises:
    a transconductance amplifier for generating a first current according to the feedback voltage and the second reference voltage;
    a first resistor; and
    a first capacitor, wherein the first resistor and the first capacitor are used for generating the compensation voltage according to the first current.

3. The control circuit of the claim 1, further comprising:
    a current pin for receiving a detection voltage determined according to a current flowing through the power switch and a resistor;
    wherein the gate signal generator is further used for disabling the gate control signal according to the detection voltage and a third reference voltage.

4. The control circuit of the claim 1, wherein the frequency limiting signal generator comprises:
    a counter for receiving the gate control signal, wherein the counter counts the gate control signal when the signal generation unit stops generating the burst mode signal, and generates a first number and a second number according to the gate control signal, wherein the first number is less than the second number;
    a sampling and holding unit for storing a first voltage generated by the auxiliary winding corresponding to the first number and a second voltage generated by the auxiliary winding corresponding to the second number;
    a second comparator for generating a second comparison result when the second voltage is greater than the first voltage; and
    a frequency limiting unit for generating the frequency limiting signal to the gate signal generator according to the second comparison result.

5. The control circuit of the claim 1, wherein the gate signal generator is further used for generating the gate control signal to the power switch according to the zero-crossing signal.

6. The control circuit of the claim 5, further comprising:
    a current pin for receiving a detection voltage determined according to a current flowing through the power switch and a resistor;
    wherein the gate signal generator is further used for disabling the gate control signal according to the detection voltage and a third reference voltage.

7. The control circuit of the claim 1, wherein the predetermined frequency is adjustable.

8. The control circuit of the claim 1, further comprising:
    a gate pin, wherein the gate control signal is transmitted to the power switch through the gate pin.

9. An operation method of a control circuit for reducing touch current of a power converter, the operation method comprising:
    receiving a voltage generated by an auxiliary winding of the power converter;
    generating a zero-crossing signal according to the voltage generated by the auxiliary winding and a first reference voltage;
    receiving a feedback voltage corresponding to an output voltage of the power converter;
    generating a compensation voltage according to the feedback voltage and a second reference voltage;
    counting a gate control signal when the compensation voltage is greater than a burst mode reference voltage and a burst mode signal is stopped generating, and generating a first number and a second number according to the gate control signal, wherein the first number is less than the second number;
    generating a frequency limiting signal to the gate signal generator when a first voltage generated by the auxiliary winding corresponding to the first number is greater than a second voltage generated by the auxiliary winding corresponding to the second number; and
    generating the gate control signal to a power switch of the power converter according to the frequency limiting signal and the zero-crossing signal;
    wherein the frequency limiting signal is used for limiting the gate control signal to a predetermined frequency.

10. The operation method of claim 9, further comprising:
    receiving a detection voltage determined according to a current flowing through the power switch and a resistor; and
    disabling the gate control signal according to the detection voltage and a third reference voltage.

11. The operation method of claim 9, wherein generating the gate control signal according to the gate control signal, the burst mode reference voltage, the zero-crossing signal, the feedback voltage, and the voltage generated by the auxiliary winding comprises:

generating the gate control signal according to the zero-crossing signal when the second voltage is less than the first voltage.

12. The operation method of claim 11, further comprising:

receiving a detection voltage determined according to a current flowing through the power switch and a resistor; and disabling the gate control signal according to the detection voltage and a third reference voltage.

13. The operation method of claim 9, wherein the predetermined frequency is adjustable.

14. The operation method of claim 9, further comprising:

generating the burst mode signal when the compensation voltage is less than the burst mode reference voltage; and generating the gate control signal according to the burst mode signal and the zero-crossing signal.

15. The operation method of claim 14, further comprising:

receiving a detection voltage determined according to a current flowing through the power switch and a resistor; and disabling the gate control signal according to the detection voltage and a third reference voltage.

16. The operation method of claim 9, wherein the feedback voltage corresponds to a load coupled to the power converter.

* * * * *